US 6,326,795 B1
United States Patent
Matsumoto et al.
(10) Patent No.: US 6,326,795 B1
(45) Date of Patent: Dec. 4, 2001

(54) CAPACITANCE DETECTION SYSTEM AND METHOD

(75) Inventors: Toshiyuki Matsumoto, Hyogo-ken; Yoshihiro Hirota, Kyoto; Muneo Harada, Hyogo-ken; Takaya Miyano, Aomori-ken, all of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/402,699

(22) PCT Filed: Feb. 19, 1999

(86) PCT No.: PCT/JP99/00736

§ 371 Date: Oct. 8, 1999

§ 102(e) Date: Oct. 8, 1999

(87) PCT Pub. No.: WO99/42848

PCT Pub. Date: Aug. 26, 1999

(30) Foreign Application Priority Data

Feb. 19, 1998 (JP) .................................. 10-078244
Apr. 27, 1998 (JP) .................................. 10-116357
May 14, 1998 (JP) .................................. 10-131736

(51) Int. Cl.$^7$ .................................................. G01R 27/26
(52) U.S. Cl. ........................... 324/679; 324/658; 324/669
(58) Field of Search .......................... 324/679, 658, 324/669, 684, 130; 73/862.626, 335.04; 330/9

(56) References Cited

U.S. PATENT DOCUMENTS

| 4,473,796 | 9/1984 | Nankivil . |
| 4,498,044 | 2/1985 | Horn . |

(List continued on next page.)

FOREIGN PATENT DOCUMENTS

| 3413846 A | 8/1985 | (DE) . |
| 4135991 C | 12/1992 | (DE) . |
| 0193421A | 9/1986 | (EP) . |
| 2002143A | 2/1979 | (GB) . |
| 2020816 A | 11/1979 | (GB) . |
| 1580335A | 12/1980 | (GB) . |
| 06180336 | 6/1994 | (JP) . |
| 09280806 | 10/1997 | (JP) . |

OTHER PUBLICATIONS

Op–amp circuit measures diode–junction capacitance, by D. Monticello and T. Frederiksen, Engineer's notebook, Electronics, Jul. 10, 1975.

Dai Ming Yuan: "Wein–Robinson–Oszillator Zur Messung Kleiner Kapazitatsanderungen" Elektronik, vol.37, No. 9, Apr. 29, 1988, pp. 86–89, XP000112122.

*Primary Examiner*—Safet Metjahic
*Assistant Examiner*—Anjan K Deb
(74) *Attorney, Agent, or Firm*—Barnes & Thornburg

(57) ABSTRACT

A detection circuit which is capable of outputting a voltage proportional to a static capacitance of a sensor is provided, which comprises a voltage input terminal connected to receive an input voltage and an operational amplifier. The input voltage received at the voltage input terminal is changed between two different reference voltages. An inverting input terminal of the amplifier is connected to the voltage input terminal through a resistor, and a non-inverting input terminal of the amplifier is connected to the voltage input terminal through the sensor capacitance and to one of the reference voltages through a switch. An output voltage of the amplifier is connected to the inverting input terminal through a feedback circuit including a resistor and a switch. The switches are closed and the one of the reference voltages is supplied to the input terminal during an initialization cycle. The switches are opened and the other reference voltage is supplied to the input terminal during a measurement cycle. The operational amplifier outputs an output voltage which linearly varies in response to the sensor capacitance.

12 Claims, 4 Drawing Sheets

U.S. PATENT DOCUMENTS

| | | |
|---|---|---|
| 4,918,376 | 4/1990 | Podjue et al. . |
| 5,416,470 | 5/1995 | Tanaka et al. . |
| 5,515,723 | 5/1996 | Tsuchida et al. . |
| 5,633,594 * | 5/1997 | Okada .................................. 324/679 |
| 5,701,101 | 12/1997 | Weinhardt et al. . |
| 5,808,516 | 9/1998 | Barber . |
| 5,886,529 | 3/1999 | Wakamatsu . |
| 6,054,867 | 4/2000 | Wakamatsu . |

* cited by examiner

CAPACITANCE DETECTION SYSTEM AND METHOD

The present application is a continuation of International Application Ser. No. PCT/JP99/00736, filed Feb. 9, 1999.

TECHNICAL FIELD

The present invention generally relates to a capacitance-voltage conversion system and method, and more particularly to a system and method of detecting a capacitance of a sensor which varies in response to a physical amount applied to a sensor, by converting the sensor capacitance to a voltage.

BACKGROUND ART

FIG. 1 illustrates a schematic diagram of a capacitance variation detection circuit of a prior art described in Japanese Patent Public Disclosure (Kokai) No. 6-180336, to which a static capacitance of a sensor formed of a diaphragm and an electrode facing each other is connected. The static capacitance varies when the diaphragm moves in response to a physical pressure or the like applied thereto. The prior circuit shown in FIG. 1 has been proposed to solve a problem that a voltage applied to a sensor comprising a diaphragm and an electrode opposite thereto causes the electrode to come in contact with the diaphragm in response to an electrostatic attractive force, when the sensor is formed through fine machining on a semiconductor.

In FIG. 1, the reference numerals 1 and 2 designate voltage input and output terminals of the capacitance variation detection circuit, respectively. An input voltage Vin is supplied to the input terminal 1, and an output voltage Vout is output from the output terminal 2. The reference numerals 3 denotes an operational amplifier, 4 and 5 resistors, and 6 a switch. The input terminal 1 is connected to an inverting and non-inverting input terminals of the operational amplifier 3 through the resistor 5 and a static capacitance of the sensor S, respectively. An output of the operational amplifier 3 is connected to the output terminal 2 and to the inverting input terminal through the resistor 4. The non-inverting input terminal is grounded through the switch 6.

In the detection circuit of FIG. 1, the switch 6 is closed during an initialization period to charge the sensor capacitance to the voltage Vin supplied to the input terminal 1, and is opened when a measurement of the sensor capacitance is made. During the opening state of the switch 6, since the capacitance of the sensor S is connected to the non-inverting input terminal of a high input impedance, the charge accumulated on the capacitance is not discharged. On the other hand, as a physical change is applied to the sensor S by varying pressure to the diaphragm forming the sensor S, for instance, the static capacitance of the sensor S changes, causing a change in a voltage across the sensor capacitance. This voltage change is amplified by the operational amplifier 3, a gain of which is determined by the resistors 4 and 5, and appears at the output terminal 2.

In supplementing the foregoing description using equations, it should be assumed that resistances of the resistors 4 and 5 are Rf and Ri, the original static capacitance of the sensor S is Cs, and voltages at the non-inverting and inverting input terminals of the operational amplifier 3 are $v^+$ and $v^-$, respectively. Now, when the switch 6 is closed, the output voltage Vout is expressed by the following equation:

$$Vout = -Vin * Rf/Ri \quad (1)$$

Assuming that the sensor capacitance changes from Cs to Cs' and the output voltage of the operational amplifier 3 changes from Vout to Vout' after the switch 6 is opened for measurement, Vout' is represented as follows:

$$Vout' = \{1 + [1 + (Rf/Ri)](Cs/Cs')\} * Vin \quad (2)$$

Here, with $$Vout' - Vout = \Delta V, \text{ and } Cs' - Cs = \Delta Cs, \ \Delta V = [1 + (Rf/Ri)] * \Delta Cs/(Cs + \Delta Cs) * Vin \quad (3)$$

is satisfied between $\Delta V$ and $\Delta Cs$.

As mentioned above, since the output voltage Vout varies in response to the gain of the amplifier (that is the ratio Rf/Ri of the resistors 4 and 5) as well as the sensor capacitance Cs, it is not necessary to apply a high voltage as the input voltage Vin to the sensor capacitance.

With a low input voltage Vin, an electrostatic attractive force to the diaphragm may be relatively small. Therefore, the detection circuit shown in FIG. 1 may solve the problem that the electrode comes in contact with the diaphragm due to the electrostatic attractive force.

SUMMARY OF THE INVENTION

However, it still implies another problem regarding a parasitic capacitance in the prior detection circuit illustrated in FIG. 1. That is, a parasitic capacitance Cp is generally formed at a point connecting the sensor S to the operational amplifier 3. The parasitic capacitance Cp is connected to the switch 6 in parallel, and may be in a range from about one to a hundred pF, when the sensor S and the operational amplifier 3 are implemented on separate chips. On the other hand, the sensor capacitance Cs may be in a range from one to several hundreds fF. In taking such a parasitic capacitance into account, when the sensor capacitance Cs changes, the charge of the capacitance Cs is distributed to the parasitic capacitance Cp. Accordingly, a change in a voltage across the sensor capacitance Cs becomes extremely small, thus resulting in deteriorated noise immunity.

A voltage displacement $\Delta v^+$ at the non-inverting input terminal of the amplifier 3 is expressed by the following equation:

$$\Delta v^+ = (v^+ - Vin) * \Delta Cs/(Cp - Cs - \Delta Cs) \quad (4)$$

In the equation (4), since $\Delta Cs/(Cp - Cs - \Delta Cs)$ is one per several hundreds, $\Delta v^+$ is also one per several hundreds, thus taking an extremely small value. In order to obtain a large voltage displacement $\Delta v^+$, it is considered that the input voltage Vin to the operational amplifier 3 is increased and/or a sensibility of the sensor S is increased.

However, in case that the input voltage Vin is increased, it causes a problem that the diaphragm and electrode may contact each other, as mentioned above. On the other hand, if a gain of the amplifier is increased to obtain a large sense sensibility, it may cause the output voltage Vout to saturate, resulting in no change in the output voltage Vout even though the sensor capacitance is varied. If the input voltage Vin supplied to the operational amplifier having a large gain is reduced to prevent the output voltage Vout from saturation, another problem arises in that a control of such a change in a small input voltage itself may complicated and difficult.

The present invention has been made to solve problems as mentioned above inherent to a prior detection circuit as shown in FIG. 1. Therefore, it is an object of the present invention to provide a capacitance detection system capable of deriving an output voltage which varies in response to a sensor capacitance if a parasitic capacitance exists.

Another object of the present invention is to provide a capacitance is detection system capable of deriving an output voltage which is substantially proportional to a sensor capacitance if a parasitic capacitance exists.

The capacitance detection system according to the present invention is usable as a static capacitance detection circuit for detecting a static capacitance of a sensor comprising a diaphragm and an electrode facing each other, which varies in response to a physical variation applied to the sensor.

In order to achieve the objects, a capacitance detection system according to the present invention which provides an output corresponding to a capacitance of a sensor comprising (a) a voltage input connected to receive an input voltage which is changed, and (b) an operational amplifier having an inverting input connected to the voltage input through a first resistor, a non-inverting input connected to the voltage input through a sensor and to a reference voltage through a first switch, and an output connected to the inverting input through a circuit including a second resistor and a second switch connected in parallel to each other.

It is preferable for the capacitance detection system to further comprises (c) a second operational amplifier having an inverting input connected to the voltage input through a third resistor, a non-inverting input connected to the reference voltage, and an output connected to the inverting input through a second circuit including a fourth resistor and a third switch connected in parallel to each other, a gain of the second amplifier being the same as that of the first operational amplifier, and (d) a third operational amplifier having inverting and non-inverting inputs respectively connected to receive output voltages of the first and second operational amplifiers. The first through third switches are closed at the same timing and the reference voltage is supplied to the voltage input during an initialization cycle, and these switches are opened and a second reference voltage is supplied to the voltage input during a measurement cycle.

The present invention also provides a capacitance detection method of providing a voltage proportional to a capacitance of a sensor, which comprises the steps of (a) outputting a first voltage defined by the sensor capacitance and a parasitic capacitance formed at a connection portion between the sensor capacitance and a capacitance detection circuit, (b) outputting a second voltage not related to the sensor and parasitic capacitances, and (c) outputting a voltage corresponding to a difference between the first and second voltages, which is proportional to the sensor capacitance.

BEST MODE FOR CARRYING OUT THE INVENTION

In the following, preferred embodiments of a capacitance detection circuit according to the present invention will be explained in detail with reference to FIGS. 2–4.

Figure 1:
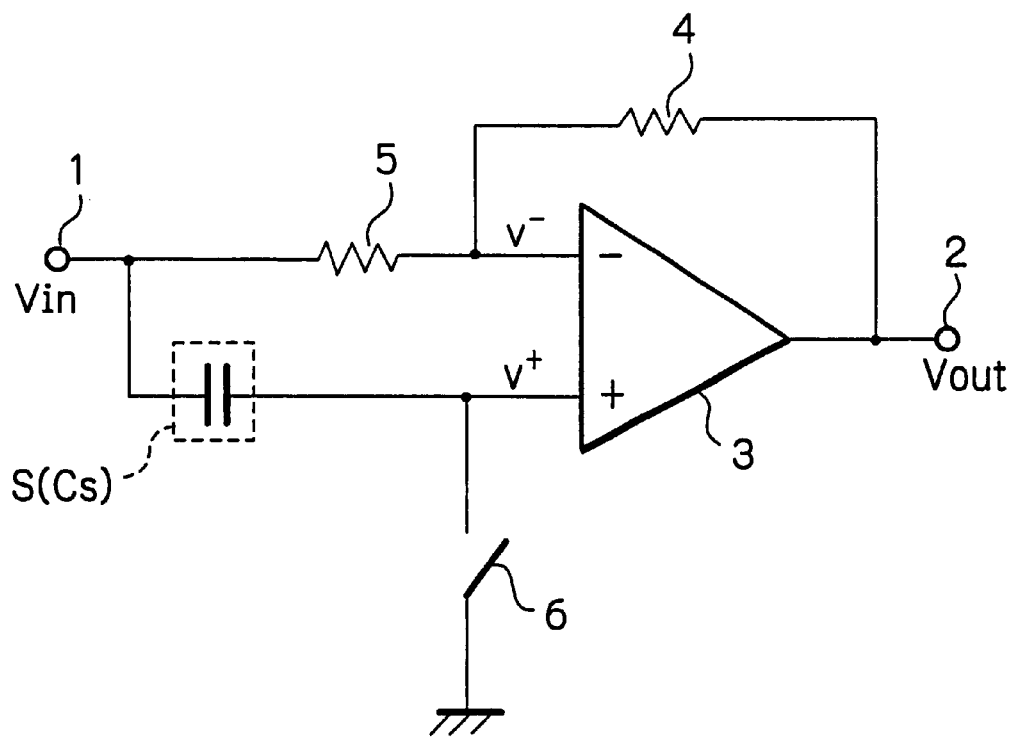
FIG. 1 shows a circuit diagram of a prior capacitance variation detection circuit.
Figure 2:
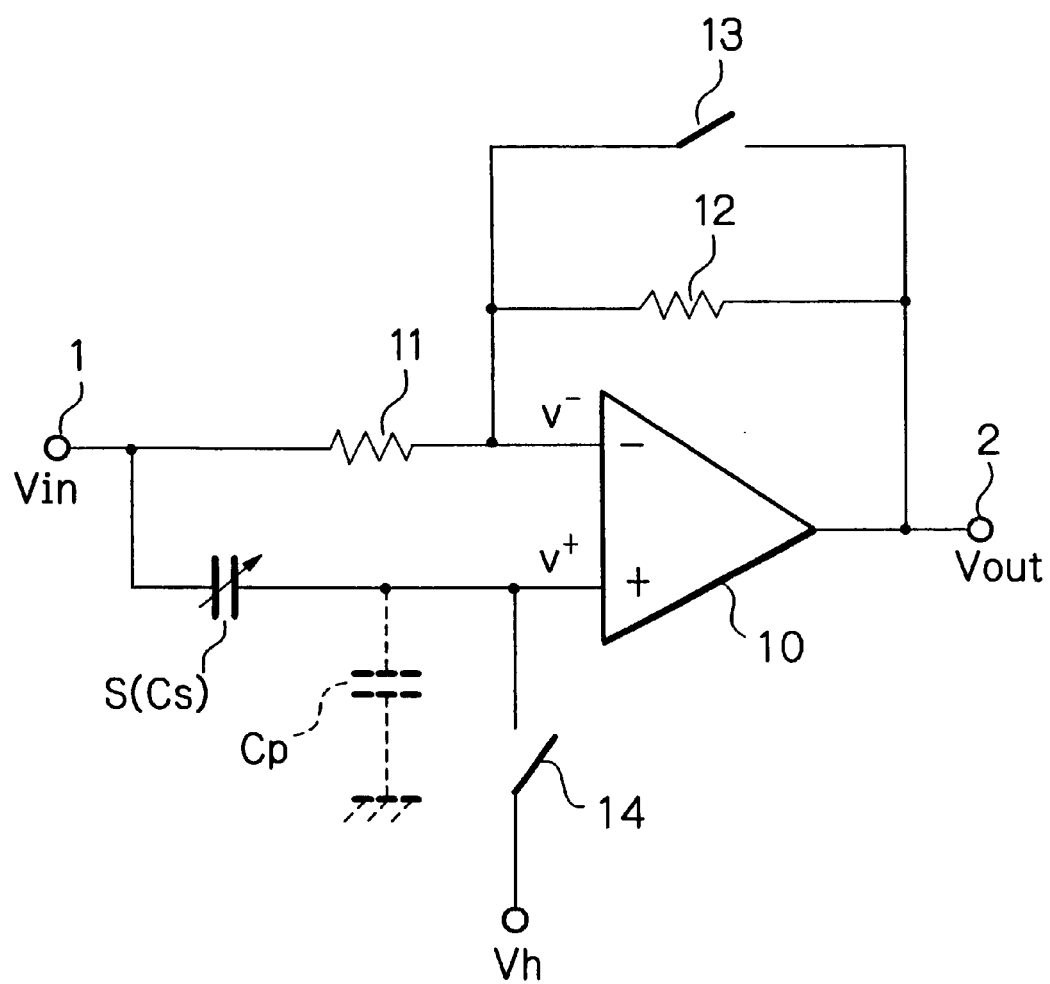
FIG. 2 illustrates a circuit diagram illustrating an embodiment of a capacitance detection circuit for providing an output voltage associated with a sensor capacitance, according to the present invention.

FIG. 2 illustrates a circuit diagram of a first embodiment of a capacitance detection circuit according to the present invention. In FIG. 2, an input terminal 1 applied with an input voltage Vin, is connected to an inverting input terminal or node of an operational amplifier 10 through a resistor 11. A parallel circuit constituted by a resistor 12 and a switch 13 is connected between an output terminal or node and the inverting input terminal of the amplifier 10. A non-inverting input terminal or node of the operational amplifier 10 is supplied with a reference voltage Vh by way of a switch 14, and a sensor S having a static capacitance Cs is connected between the non-inverting input terminal of the amplifier 10 and the input terminal 1. A parasitic capacitance Cp may be formed at a connection portion between the sensor S and the non-inverting input terminal of the amplifier 10.

The reference voltage Vh is, for example, a ground voltage, though other voltages are usable. An exemplary configuration of the sensor S is one that forms a capacitance Cs between a diaphragm and an electrode facing each other, both of which are micro-machined to have an extremely small area. The sensor S changes the capacitance Cs in response to a displacement of the diaphragm caused by a physical variation applied thereto.

A detection sequence of the capacitance Cs of the sensor S comprises initialization and measurement cycles. During the initialization cycle, the switches 13 and 14 are closed and the input voltage Vin is set at the reference voltage Vh, or Vin=Vh, causing the output voltage Vout to be set at the same reference voltage Vh. (Hereafter, the word "during" means a whole or a part of the period.) On the other hand, during the measurement cycle, the switches 13 and 14 are opened and the input voltage Vin is set at a voltage Vh+ΔV.

When the switch 13 and 14 are opened to measure the capacitance Cs, the following equation is satisfied for the output voltage Vout of the operational amplifier 10, where Ri1 and Rf1 are resistances of the resistors 11 and 12, respectively; $v^+$ and $v^-$ are the voltages at the non-inverting and inverting input terminals of the amplifier 10; and Rf1=Ri1 are set.

$$Vout = -(Rf1/Ri1)(Vin - v^+) + v^+ \qquad (5)$$
$$= -Vin + 2v^+$$

When the input voltage Vin is changed from Vh, which has been Ad set during the initialization cycle, to Vh+ΔV, charge Q1 accumulated on the sensor capacitance Cs and charge Q2 accumulated on the parasitic capacitance Cp are expressed by:

$$Q1 = (Vin - v^+)Cs \qquad (6)$$
$$= (Vh + \Delta V - v^+)Cs$$
$$Q2 = v^+ Cp \qquad (7)$$

Since the sensor capacitance Cs and the parasitic capacitance Cp are connected in series so that an equal amount of charge is accumulated on the respective capacitances Cs and Cp, Q1=Q2 stands. Therefore, the following equation is satisfied:

$$v^+Cp=(Vh+\Delta V-v^+)Cs \qquad (8)$$

Since Vh=0 as mentioned above, the voltage $v^+$ at the non-inverting input terminal of the operational amplifier 10 is expressed by:

$$v^+ = \Delta V * Cs/(Cs+Cp) \quad (9)$$

Substituting this equation (9) to the equation (5), the output voltage Vout of the operational amplifier 10 is rewritten as follows:

$$Vout = -Vin + 2v^+ \quad (10)$$
$$= -Vin + 2 * \Delta V * Cs/(Cs+Cp)$$

When the sensor S and the remaining circuit portion of the detection circuit in FIG. 2 are formed on separate chips with electrical connection, the parasitic capacitance Cp may be approximately in a range from several pF to about fifteen pF or more, while the capacitance Cs of the sensor S is generally from about one to several hundreds of fF.

Accordingly, since Cp is much larger than Cs, Cs/Cp may be used instead of Cs/(Cs+Cp). Thus, the output voltage Vout of the operational amplifier 10 is expressed by:

$$Vout = -Vin + 2 * \Delta V * Cs/Cp \quad (11)$$

This equation indicates that the output voltage Vout of the detection circuit linearly varies, in response to the capacitance Cs.

Thus, even if the parasitic capacitance Cp exists around the non-inverting input terminal of the operational amplifier 10, the capacitance detection circuit can output the voltage Vout having a linear relationship to the capacitance Cs, as long as the capacitance Cs is much smaller than the parasitic capacitance Cp. Moreover, a sufficiently large output voltage Vout can be produced by adjusting the gain (Rf1/Ri1) of the operational amplifier 10 and a changing amount $\Delta V$ of the input voltage Vin, in accordance with the capacitance Cs.

Figure 3:
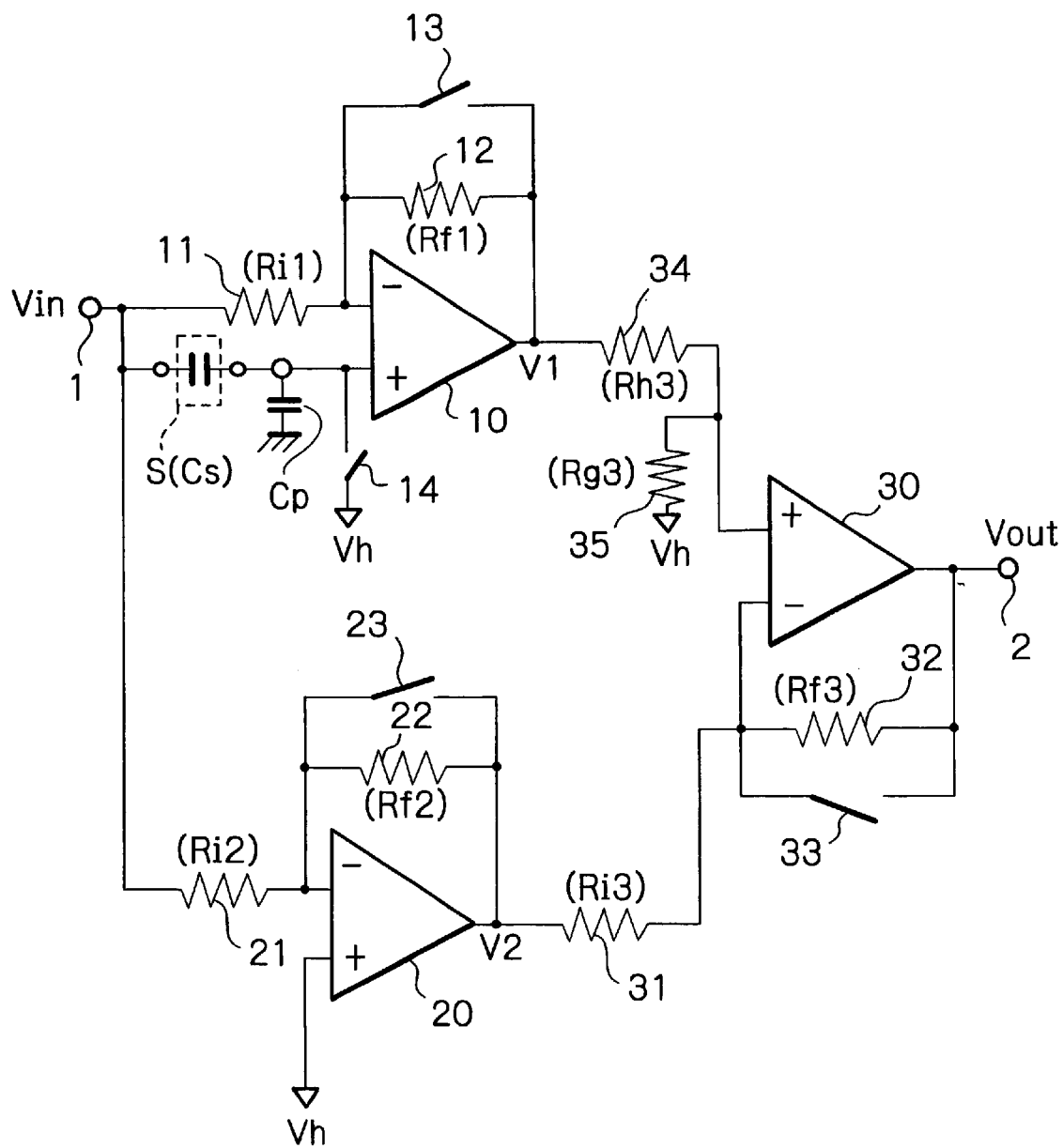
FIG. 3 shows a diagram generally illustrating a second embodiment of a capacitance detection circuit for providing an output voltage associated with a sensor capacitance, according to the present invention.

FIG. 3 is a circuit diagram illustrating a second embodiment of the capacitance detection circuit according to the present invention, in which the capacitance detection circuit shown in FIG. 2 is utilized. The circuit in FIG. 3 includes further means for canceling the "−Vin" from the equation (11) to obtain a proportional relationship between a sensor capacitance and an output voltage.

In FIG. 3, an input terminal 1 applied with an input voltage Vin, is connected to an inverting input terminal or node of a first operational amplifier 10 through a resistor 11. A parallel circuit of a resistor 12 and a switch 13 is connected between an output terminal or node and the inverting input terminal of the amplifier 10. A non-inverting input terminal or node of the operational amplifier 10 is supplied with a reference voltage VA through a switch 14, and a sensor S having a capacitance Cs is connected between the non-inverting input terminal of the amplifier 10 and the input terminal 1.

The input terminal 1 is also connected to an inverting input terminal or node of a second operational amplifier 20 through a resistor 21. A parallel circuit of a resistor 22 and a switch 23 is connected between the inverting input terminal and an output terminal or node of the amplifier 20. The amplifier 20 is supplied at its non-inverting input terminal or node with the reference voltage Vh. The second operational amplifier 20 outputs a voltage V2.

Further, the output terminal of the second operational amplifier 20 is connected to an inverting input terminal or node of a third operational amplifier 30 through a resistor 31. A parallel circuit of a resistor 32 and a switch 33 is connected between the inverting input terminal of the amplifier 30 and an output terminal or node thereof, which is an output terminal 2 of the capacitance detection circuit. A non-inverting input terminal or node of the third operational amplifier 30 is connected to the output terminal of the first operational amplifier 10 through a resistor 34, and is supplied with the reference voltage Vh through a resistor 35. From the output terminal 2, an output voltage Vout is provided.

In the circuit shown in FIG. 3, the sensor S and a circuit portion (other than the sensor S) are formed on separate chips, and the sensor S to is electrically connected to the non-inverting input terminal of the operational amplifier 10. A parasitic capacitance Cp may be formed on the connection portion.

An operation of the capacitance detection circuit illustrated in FIG. 3 will next be explained. During an initialization cycle, all the switches 13, 14, 23 and 33 are closed, and the input voltage Vin supplied to the input terminal 1 is set to the reference voltage Vh. This causes that no charge is accumulated in the capacitance Cs because both ends thereof are the same voltage Vh.

During a measurement cycle, all the switches 13, 14, 23 and 33 are opened, and the input voltage Vin supplied to the input terminal 1 is changed from Vh to Vh+$\Delta V$. As a result of charge distributed between the sensor capacitance Cs and the parasitic capacitance Cp in response to the input voltage change, a voltage associated with the capacitance Cs and the parasitic capacitance Cp is input to the non-inverting input terminal of the first operational amplifier 10. The voltage at the non-inverting input terminal is then amplified, and appears as a measured voltage V1 at the output terminal of the operational amplifier 10. A gain of the amplifier 10 is set to a value that does not cause the output voltage V1 to saturate.

A gain of the second operational amplifier 20 is set to the same value as that of the first operational amplifier 10. As illustrated in FIG. 3, since the operational amplifier 20 is also applied at the inverting input terminal with the same input voltage Vin, the second operational amplifier 20 outputs a voltage V2 in a state where the sensor and parasitic capacitances are not connected.

The output voltage V1 of the first operational amplifier 10 is provided to the non-inverting input terminal of the third operational amplifier 30 through the resistor 34, while the output voltage of he second operational amplifier 20 is provided to the inverting input terminal of the third operational amplifier 30 through the resistor 31. Therefore, the third operational amplifier 30 amplifies the difference between the output voltage V1 of the first operational amplifier 10 (i.e., a voltage relating to the sensor capacitance Cs and the parasitic capacitance Cp) and the output voltage V2 of the second operational amplifier 20 (i.e., a voltage not relating to the sensor capacitance), and outputs the differentially amplified voltage as the output voltage Vout.

As it will be discussed in detail below, the output voltage Vout from the third operational amplifier 30 is more proportional to the sensor capacitance Cs as the ratio of the capacitance Cs to the parasitic capacitance Cp (or Cs/Cp) is smaller. A proportionality factor is a function of the gain of the operational amplifier 30 and a voltage shifting amount of the input voltage Vin. Actually, since the parasitic capacitance Cp is larger than the sensor capacitance Cs, the third operational amplifier 30 outputs a voltage which linearly varies in response to the capacitance Cs.

The foregoing operation will be explained using equations. Assuming that the operational amplifiers 10, 20 and 30 are supplied with positive and negative power supplies $V^+$ and $V^-$ having the same magnitude, and the reference voltage Vh=0 (volt). It should be noted that Vh=0 is not essential in the detection circuit according to the present invention. While the voltage Vh may take a positive or negative value depending on the power supply voltages V⁺ and V⁻ of the operational amplifiers, the following explanation will proceed with Vh=0 for simplicity thereof.

During the initialization cycle, since the switches 13, 14, 23, 33 are closed and the input voltage is set to Vin=Vh=0, the output voltage V1 of the first operational amplifier 10 and the output voltage V2 of the second operational amplifier 20 are expressed by:

$$V1 = V2 = Vh = 0$$

Next, when the switches 13, 14, 23 and 33 are opened to measure the static capacitance Cs, the following equations are satisfied for the output voltages V1, V2, Vout of the first through third operational amplifiers 10, 20, 30, respectively, where Ri1, Rf1, Ri2, Rf2, Ri3, Rf3, Rh3, Rg3 are resistances of the resistors 11, 12, 21, 22, 31, 32, 34 and 35, respectively; K=Rg3/Rh3=Rf3/Ri3; v⁺ and v⁻ are the voltages at the non-inverting and inverting input terminals of the amplifier 10; and Rf1=Ri1 and Rf2=Ri2 are set.

$$V1 = -(Rf1/Ri1)(Vin - v^+) + v^+ \qquad (12)$$
$$= -Vin + 2v^+$$

$$V2 = -(Rf2/Ri2)(Vin - Vh) + Vh \qquad (13)$$
$$= -Vin$$

$$Vout = K(V1 - V2) \qquad (14)$$

When the input voltage Vin is changed from Vh, which has been set during the initialization cycle, to Vh+ΔV, charge Q1 accumulated on the sensor capacitance Cs and charge Q2 accumulated on the parasitic capacitance Cp are expressed by:

$$Q1 = (Vin - v^+)Cs \qquad (15)$$
$$= (Vh + \Delta V - v^+)Cs$$

$$Q2 = v^+ Cp \qquad (16)$$

Since the sensor capacitance Cs and the parasitic capacitance Cp are connected in series so that an equal amount of charge is accumulated on the capacitances Cs and Cp, Q1=Q2 stands. Therefore, the following equation is satisfied:

$$v^+ Cp = (Vh + \Delta V - v^+)Cs$$

Since Vh=0 as mentioned above, the voltage v⁺ at the non-inverting input terminal of the first operational amplifier 10 is expressed by:

$$v^+ = \Delta V * Cs/(Cs+Cp) \qquad (17)$$

Using the equation (17), the respective equations (12) and (14) are rewritten as follows:

$$V1 = -Vin + 2v^+ \qquad (18)$$
$$= -Vin + 2*\Delta V * Cs/(Cs+Cp)$$

$$Vout = K(V1 - V2) \qquad (19)$$
$$= K[-Vin + 2*\Delta V * Cs/(Cs+Cp) + Vin]$$
$$= 2K * \Delta V * Cs/(Cs+Cp)$$

When the sensor S and the remaining circuit portion of the detection circuit in FIG. 3 are formed on separate chips with electrical connection, the parasitic capacitance Cp may be approximately in a range of one pF to about one hundred pF or more, while the capacitance Cs of the sensor S is generally from about one fF to several hundreds fF. Accordingly, since Cp is much larger than Cs, Cs/Cp may be used instead of Cs/(Cs+Cp). Thus, the equation (19) (or the output voltage Vout of the third operational amplifier 30) is rewritten by:

$$Vout = 2K * \Delta V * Cs/Cp \qquad (20)$$

The equation (20) indicates that a voltage proportional to the static capacitance Cs can be derived from the third operational amplifier 30. It should be noted that even when Vh is not zero in the apparatus shown in FIG. 3, the principle of technical idea on how to solve a problem is the same as that when Vh=0, though the equation (20) under the condition of Vh≠0 becomes more complex.

Thus, even if the parasitic capacitance Cp exists at the non-inverting input terminal of the operational amplifier 10, the capacitance detection circuit illustrated in FIG. 3 can output the voltage Vout proportional to the capacitance Cs, as long as the capacitance Cs is much smaller than the parasitic capacitance Cp. Moreover, a sufficiently large output voltage Vout can be produced by adjusting the respective gains of the first through third operational amplifiers 10, 20, 30 and a changing amount of the input voltage Vin, in accordance with the capacitance Cs.

As described above, the capacitance detection circuit shown in FIG. 3 can output a voltage Vout proportional to the static capacitance Cs of the sensor S as well as increase the amount of charge accumulated on the capacitance Cs of the sensor S by changing the input voltage Vin, even if the parasitic capacitance Cp is large. In addition, since the difference between the capacitance measured voltage V1 outputted form the first operational amplifier 10 and the reference voltage V2 outputted from the operational amplifier 20 is amplified by the third operational amplifier 30, the amplifier 10 may have a smaller gain, thereby making it possible to prevent the output voltage V1 from saturation. Moreover, the gain of the third operational amplifier 30 can be adjusted in accordance with the ratio of the sensor capacitance Cs to the parasitic capacitance Cp.

Figure 4A:
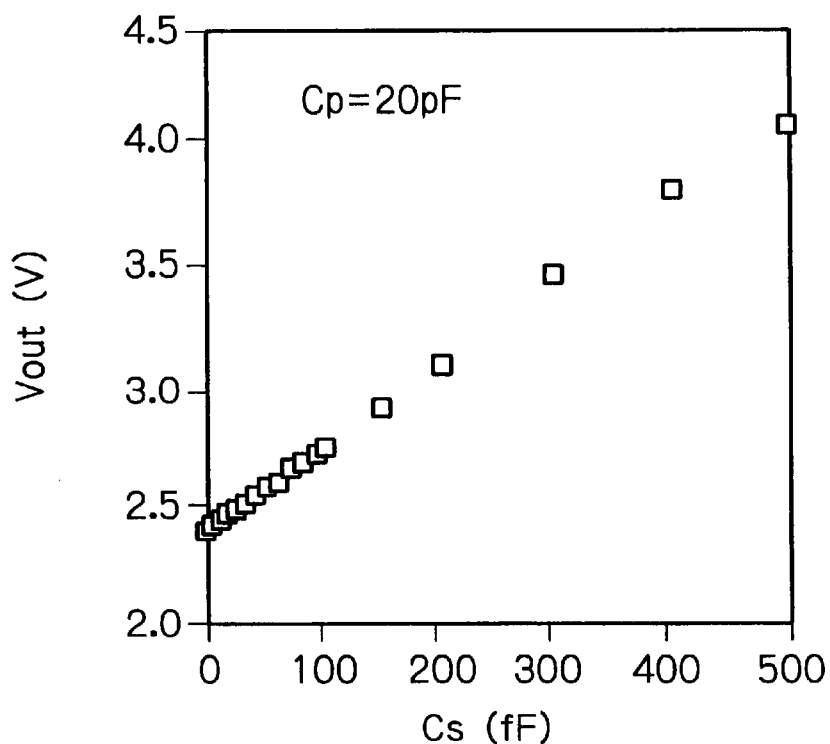
FIG. 4A is a graph showing a relationship between a sensor capacitance and an output voltage obtained in a simulation of the capacitance detection circuit shown in FIG. 3.
Figure 4B:
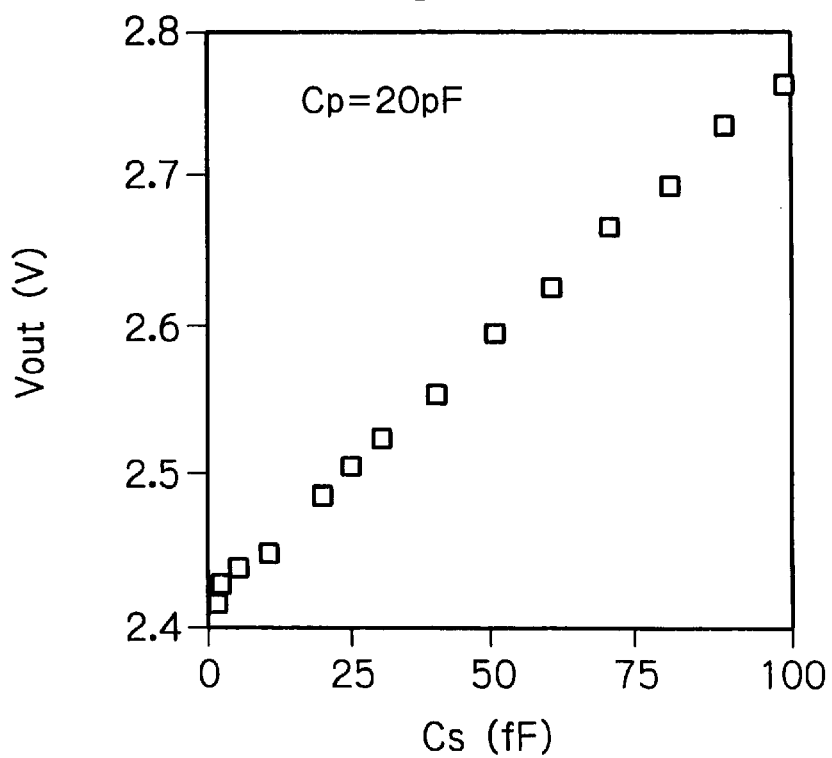
FIG. 4B is an enlarged graph of a potion of that shown in FIG. 4A.

FIG. 4 shows graphs illustrating a result of a simulated example of the capacitance detection circuit shown in FIG. 3 when the parasitic capacitance Cp has been set to 20 pF. Further, it has been assumed that v⁻=0 V, v⁺=5 V, and Vh=Vdd/2=2.5V, thereby when Cs=0, Vout≈2.5 V. The graph in FIG. 4B is an enlarged one of a portion of FIG. 4A.

FIG. 4A shows that the output voltage Vout linearly changes in a range from 2.4 V to 4.1 V when the sensor capacitance Cs is changed in a range from 0 to 500 fF, and, FIG. 4B shows that the output voltage Vout linearly changes in a range from 2.41 V to 2.77 V when Cs is changed in a range from 0 to 100 fF.

As will be understood from the foregoing detailed description on the preferred embodiments, the invention can produce unique effects that even if a parasitic capacitance is formed on a connection portion between a sensor capacitance and a detection circuit, a voltage proportional to the sensor capacitance can be derived without affected by the parasitic capacitance.

While there has been described what is at present considered to be preferred embodiments of the present invention, it will be understood that various modifications may be made therein, and it is intended to cover in the appended claims all such modifications as fall within the spirit and scope of the invention.

What is claimed is:

1. A capacitance detection system which provides an output corresponding to a capacitance of a sensor comprising:

a voltage input connected to receive an input voltage which is changed for an initialization cycle and a measurement cycle; and an operational amplifier having an inverting input connected to the voltage input through a first resistor, a non-inverting input connected to the voltage input through a sensor and to a reference voltage through a first switch, and an output connected to the inverting input through a circuit including a second resistor and a second switch connected in parallel to each other.

2. The capacitance detection system as set forth in claim 1, further comprising:

a second operational amplifier having an inverting input connected to the voltage input through a third resistor, a non-inverting input connected to the reference voltage, and an output connected to the inverting input through a second circuit including a fourth resistor and a third switch connected in parallel to each other, a gain of the second amplifier being the same as that of the first operational amplifier; and a third operational amplifier having inverting and non-inverting inputs connected to receive output voltages from the first and second operational amplifiers.

3. The capacitance detection system as set forth in claim 2, further comprising a fourth switch included in a feedback circuit of the third operational amplifier, and the fourth switch being closed and/or opened at the same timings as those of the first through third switch.

4. A capacitance detection system which provides an output corresponding to a capacitance of a sensor comprising:

a voltage input connected to receive an input voltage which is changed between first and second reference voltages; and an operational amplifier having an inverting input connected to the voltage input through a first resistor, a non-inverting input connected to the voltage input through a sensor capacitance and to the first reference voltage through a first switch, and an output connected to the inverting input through a feedback circuit including a second resistor and a second switch connected in parallel to each other;

the first and second switches being closed and the first reference voltage being supplied to the voltage input during an initialization cycle, and the first and second switches being opened and the second reference voltage being supplied to the voltage input during a measurement cycle, whereby an output voltage which linearly varies in response to the sensor capacitance is derived at the output.

5. The capacitance detection system as set forth in claim 4, further comprising:

a second operational amplifier having an inverting input connected to the voltage input through a third resistor, a non-inverting input connected to the first reference voltage, and an output connected to the inverting input through a second feedback circuit including a fourth resistor and a third switch connected in parallel to each other, a gain of the second amplifier being the same as that of the first operational amplifier; and a third operational amplifier having inverting and non-inverting inputs connected to receive output voltages of the first and second operational amplifiers;

the third switch being closed and/or opened at the same timings as those of the first and second switches, whereby an output voltage which is proportional to the sensor capacitance is derived from an output of the third operational amplifier.

6. The capacitance detection system as set forth in claim 5, further comprising a fourth switch included in a feedback circuit of the third operational amplifier, and the fourth switch being closed and/or opened at the same timings as those of the first through third switch.

7. A capacitance detection system for outputting a voltage proportional to a capacitance of a sensor, comprising:

a first circuit for providing a first voltage related to the sensor capacitance and a parasitic capacitance formed at a connection portion between the sensor capacitance and the detection circuit;

a second circuit having the same circuit characteristics as the first circuit, for providing a second voltage not related to the sensor and parasitic capacitances; and a third circuit for outputting a voltage corresponding to a difference between the first and second voltages, whereby the voltage being proportional to the sensor capacitance.

8. The capacitance detection system as set forth in claim 7, wherein the first circuit comprises a first amplifier having an input connected to a voltage input through a sensor capacitance, for providing the first voltage which linearly varies in response to the sensor capacitance and a parasitic capacitance formed around the input;

the second circuit comprises a second amplifier connected to the voltage input and having the same gain as that of the first amplifier, for providing the second voltage not related to the sensor parasitic capacitances; and the third circuit comprises a third amplifier for receiving the first and second voltages to output the voltage corresponding to the difference between the first and second voltages.

9. The capacitance detection system as set forth in claim 8, wherein the first through third amplifiers comprise first through third operational amplifiers, respectively, the sensor capacitance is connected between the voltage input and the non-inverting in put of the first operational amplifier, and switches for initializing the detection circuit are connected between the inverting inputs and the outputs of the first and second operational amplifiers, between the inverting input and the output of the third operational amplifier, and between the non-inverting in put of the first operational amplifier and a reference voltage terminal.

10. A capacitance detection method of providing a voltage proportional to a capacitance of a sensor, comprising the steps of:

outputting a first voltage defined by the sensor capacitance and a parasitic capacitance formed at a connection portion between the sensor capacitance and a capacitance detection circuit;

outputting a second voltage not related to the sensor and parasitic capacitances; and outputting a third voltage corresponding to a difference between the first and second voltages, which is proportional to the sensor capacitance.

11. The method as set forth in claim 10, wherein the step of outputting the first voltage includes the step of providing an input voltage to inverting and non-inverting inputs of a first operational amplifier through a resistor and the sensor to output the first voltage from an output thereof;

the step of outputting the second voltage includes the step of in providing the input voltage to an inverting input of a second operational amplifier to output the second voltage from an output thereof, a non-inverting input of which is connected to a reference voltage terminal; and the step of outputting the third voltage comprises the step of providing the first and second voltage to non-inverting and inverting inputs of a third operational amplifier to output the third voltage from an output of thereof.

12. The method as set forth in claim 11, wherein the first through third operational amplifiers include first through third negative feedback circuits comprising first through third resistors and first through third switches connected in parallel to each other, respectively, and the non-inverting input of the first operational amplifier is connected to the reference voltage terminal through a fourth switch, the method further comprising at least one of the steps of:

turning on the first through fourth switches during a reset cycle; and turning off the first through fourth switches before starting a measurement cycle.

* * * * *